T. DUGAN.
THRESHING MACHINE.
APPLICATION FILED OCT. 12, 1910.
1,032,127.
Patented July 9, 1912.
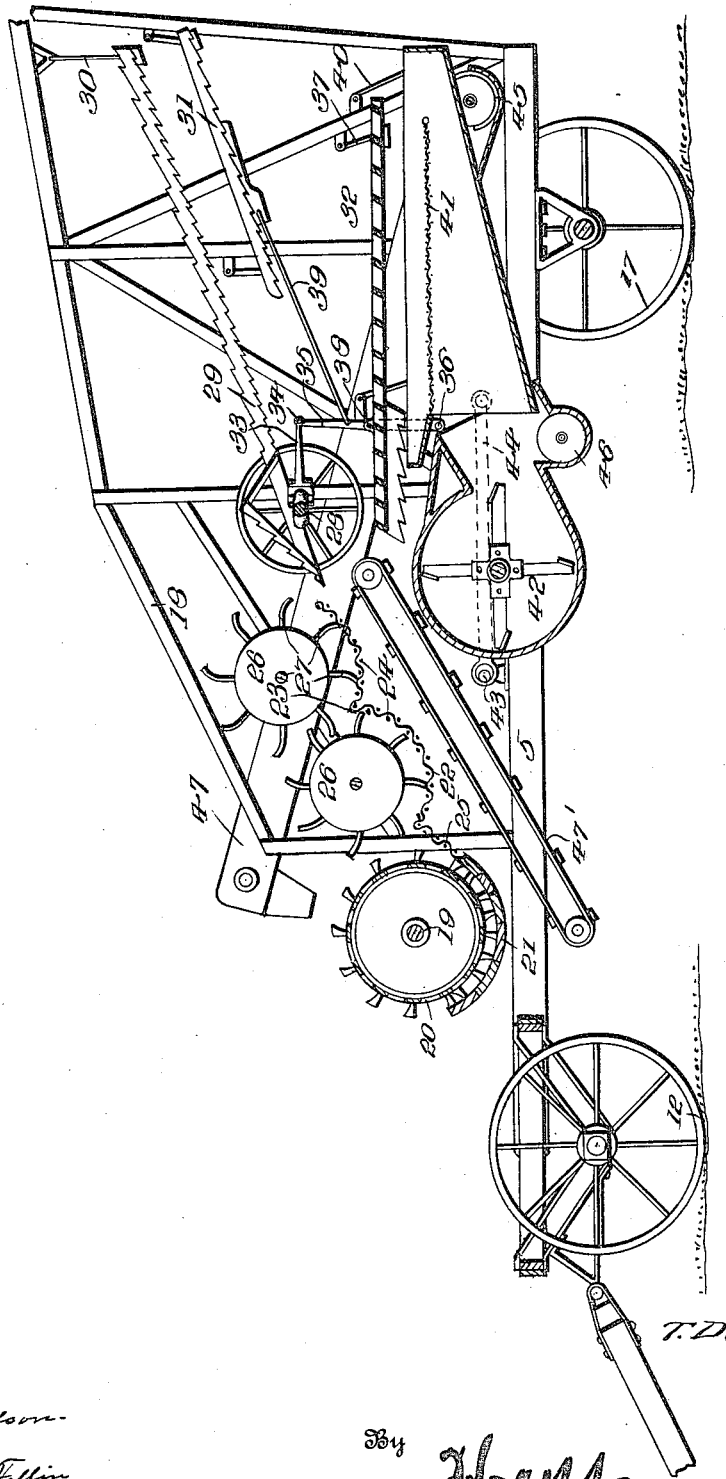

UNITED STATES PATENT OFFICE.

THOMAS DUGAN, OF LARNED, KANSAS.

THRESHING-MACHINE.

1,032,127. Specification of Letters Patent. Patented July 9, 1912.

Application filed October 12, 1910. Serial No. 586,643.

*To all whom it may concern:*

Be it known that I, THOMAS DUGAN, citizen of the United States, residing at Larned, in the county of Pawnee and State of Kansas, have invented certain new and useful Improvements in Threshing-Machines, of which the following is a specification.

This invention relates to threshing machines and has for its object the provision of a strong, durable and thoroughly efficient machine, the construction of which is such that oats, wheat, Kafir corn and the like, may be threshed, separated and cleaned at one operation thereof.

A further object is to provide a threshing machine including intermeshing beaters arranged at the rear of the threshing cylinder and which co-act with a stationary grain-bed for the purpose of removing grain from the straw before the latter is delivered to the vibrating rack.

A still further object of the invention is generally to improve this class of devices to increase their utility, durability and efficiency.

For a full understanding of the invention reference is to be had to the following description and accompanying drawings in which the figure is a longitudinal sectional view of a threshing machine constructed in accordance with my invention.

Corresponding and like parts are referred to in the following description and indicated in all the views of the accompanying drawing by the same reference characters.

The improved threshing machine forming the subject matter of the present invention comprises a supporting frame or truck having a front wheel 12 and rear wheels 17 and on which is mounted a casing 18, the front end of which is open, as shown.

Mounted for rotation in suitable bearings 19, preferably arranged slightly in advance of the open end of the casing 18 is a cylinder 20 having peripheral teeth which coact with corresponding teeth formed on a concave 21.

Secured to and preferably forming a continuation of the concave 21 is a stationary grain bed 22, which latter is disposed within the casing at the open end thereof, as shown. The grain bed 22 is preferably formed of wire screen, and is provided with a transverse rib 23 defining oppositely disposed concavities 24, one end of the screen 22 being provided with a straight extension 25 projecting through the open end of the casing for attachment to the concave of the threshing cylinder.

Mounted for rotation within the casing above each concavity 24 is a beater 26 the teeth or fingers of which co-act with the stationary grain bed 22 for the purpose of removing any grain from the straw, after the latter has passed between the cylinder and concave.

Journaled in the casing at the rear of the beaters 26 is a transverse crank-shaft 28 to which are connected the adjacent ends of a series of vibrating rack-bars 29, the opposite ends of which are connected to suitable hangers 30. Disposed beneath the rack-bars is a vibrating return bottom or plate 31 which serves to receive the grain separated from the straw by the vibrating rack-bars 29 and direct the same onto a chaffer 32.

Secured to one of the crank-arms of the shaft 28 is a laterally extending arm 33 to which is pivotally connected at 34 one end of an oscillating lever 35, the opposite end of which is pivotally mounted at 36 on a suitable support carried by the casing. One end of the chaffer 32 is suspended by a hanger 37, while the other end thereof is pivotally mounted at 38 on the intermediate portion of the lever 35, so that when the lever 35 is oscillated motion will be imparted to the chaffer 32. In order to vibrate the plate 31, there is provided a rod 39, one end of which is pivotally connected with the lever 35, while the other end thereof is attached in any suitable manner to said plate.

Disposed beneath the chaffer 32 and suspended by suitable hangers 40 is a riddle or screen 41 adapted to receive the grain, there being a fan 42 mounted for rotation in front of the riddle or screen for removing any chaff or foreign matter from the grain. Arranged in front of the fan casing and journaled in suitable bearings mounted on the longitudinal sills of the frame is a transverse shaft 43 having spaced eccentrics secured thereto which co-act with eccentric straps carried by longitudinally disposed rods 44, the latter being pivotally connected with the riddle or screen 41 so as to oscillate the latter during the operation of the machine. Arranged at the rear end of the screen 41 is a tailings auger 45, while at the front end of the screen is mounted for rotation a grain auger 46, there being an elevator 47 disposed on one side of the machine to return the unthreshed heads to the cylinder.

Disposed at the front of the machine and arranged beneath the grain bed 22 is an endless conveyer 47' which receives the grain discharged through said grain bed and deposits the grain on the chaffer for delivery to the shaking screen or riddle.

It will here be noted that by having the lever 35 pivotally mounted on the threshing machine casing and operatively connected with the chaffer 32, said lever not only forms a support for one end of the chaffer, but by reason of its connection with the crank arm 33, motion will be simultaneously imparted to the rack bars 39, vibrating plate 31, and chaffer 32.

In operation the material is fed to the threshing cylinder 20 and thence passes between the concaved portions 24 of the grain bed and beaters 26, the grain being removed from the straw and thrown outwardly by centrifugal force through the mesh of the screen 22 where it falls on the endless conveyer 47' and is thence delivered to the chaffer 32. The straw after being acted upon by the beaters 26 is delivered to the vibrating rack-bars 29, the grain dislodged from the straw by the rack-bars being directed downwardly by the plate 21 onto the riddle or screen for delivery to the grain auger, as will be readily understood.

Having thus described the invention what is claimed as new is:—

1. A threshing machine including a casing, a transverse crank-shaft journaled in the casing, vibrating rack-bars secured to the crank-shaft, an arm extending laterally from said crank-shaft, a return plate mounted for reciprocation beneath the vibrating rack, a lever having its lower end pivotally mounted on a support, and its upper end pivotally connected with said arm, a rod forming a connection between the return plate and said lever, a chaffer pivotally connected with the intermediate portion of the lever, a screen arranged beneath the chaffer, and means for vibrating the screen.

2. A threshing machine including a casing, a crank-shaft journaled in the casing, vibrating rack-bars secured to the crank-shaft, a return plate mounted for reciprocation beneath the vibrating rack-bars, an arm extending laterally from the crank-shaft, a lever having its lower end pivotally mounted on the casing, and its upper end pivotally connected with the arm, a rod forming a pivotal connection between the return plate and said lever, a chaffer suspended within the casing and connected with the intermediate portion of the lever, a screen arranged beneath the chaffer, and an inclined conveyer for delivering the grain to the chaffer and thence to the screen.

In testimony whereof I affix my signature in presence of two witnesses.

THOMAS DUGAN. [L. S.]

Witnesses:
J. W. EAGLIN,
J. B. LEASURE.

Copies of this patent may be obtained for five cents each, by addressing the "Commissioner of Patents, Washington, D. C."